United States Patent [19]
Massey

[11] 3,722,855
[45] Mar. 27, 1973

[54] BETWEEN FLANGE VALVE ASSEMBLY AND CLAMPING MEMBER

[75] Inventor: Roger G. Massey, Holden, Mass.

[73] Assignee: The Parker and Harper Manufacturing Company Inc., Worcester, Mass.

[22] Filed: July 14, 1971

[21] Appl. No.: 162,369

[52] U.S. Cl. .................251/151, 251/367, 285/415
[51] Int. Cl. .........................F16k 51/00, F16l 23/00
[58] Field of Search......251/148, 151, 152, 366, 368, 251/367; 285/413, 415

[56] References Cited

UNITED STATES PATENTS

| | | | |
|---|---|---|---|
| 3,409,268 | 11/1968 | Gachot | 251/148 |
| 2,764,431 | 9/1956 | Wilde | 285/415 |
| 630,641 | 8/1899 | Albree | 285/413 |
| 335,592 | 2/1886 | Keyworth | 285/413 X |
| 2,911,239 | 11/1959 | Marzolf, Sr. | 285/415 |

Primary Examiner—William R. Cline
Attorney—Thomas N. Tarrant

[57] ABSTRACT

A replaceable valve assembly secured into position by paired clamp members which engage flange members on either side of the valve and are bolted together by a plurality of bolts which engage only the clamp members themselves. The clamps are removable independently by removal of one of the bolts.

4 Claims, 6 Drawing Figures

Patented March 27, 1973

ROGER G. MASSEY
*Inventor*
By Thomas N. Tarout
*Attorney*

Patented March 27, 1973

ROGER G. MASSEY
*Inventor*

By *Thomas N. Tarrant*
*Attorney*

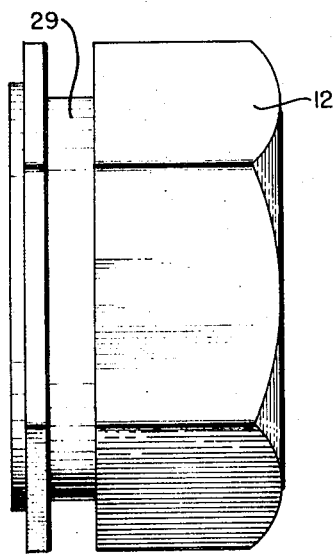
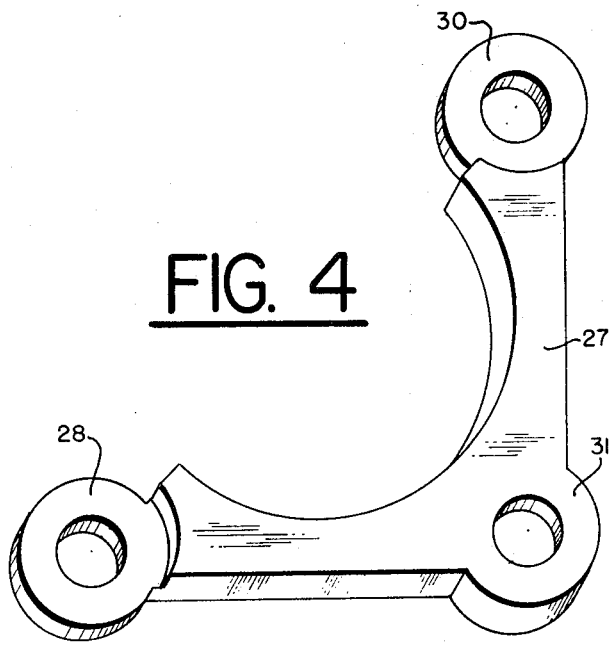
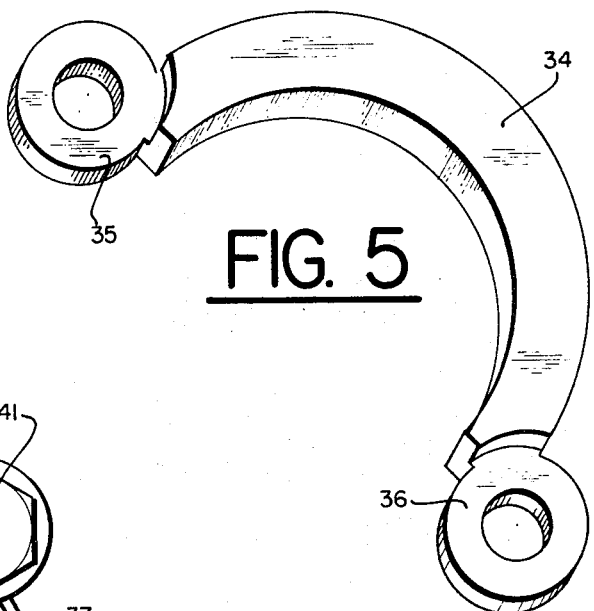
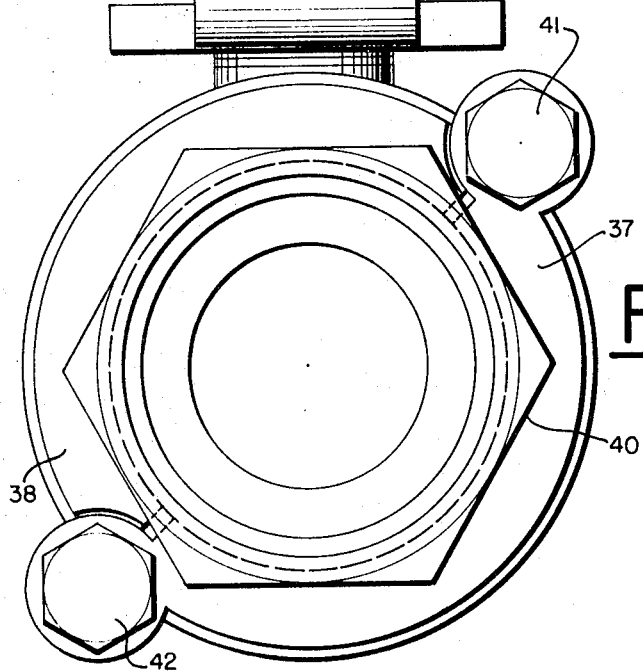
ROGER G. MASSEY
*Inventor*
By *Thomas N. Tarrant*
*Attorney*

BETWEEN FLANGE VALVE ASSEMBLY AND CLAMPING MEMBER

BACKGROUND OF THE INVENTION:

1. Field of the Invention:

The present invention relates to valves and in particular to between-flange valves and means for removably clamping such valves into a fluid-carrying line.

2. Description of the Prior Art:

Between-flange valve assemblies have been developed to permit quick and easy repair or servicing of valve assemblies without the need of unscrewing pipe lines or separating solder joints. Recent examples are found in U.S. Pat. Nos. 3,554,484 and 3,556,473. These valve assemblies can be considered as having three components consisting of two flanges, one for each end of the open pipe line and a main valve structure which is positioned between the flanges and bolted into place by bolts, usually four, that pass through the flanges and sometimes through holes cast in the body of the valve structure. In these valves, the flanges as well as the body of the valve structure are cast in order to provide means for receiving the bolts. Manufacturing with cast components is relatively slow and expensive as compared to manufacturing by machine from bar stock and by stamping processes. Thus, between-flange valves have always been relatively expensive and restricted to specialized uses.

SUMMARY OF THE INVENTION:

In accordance with the present invention a between-flange valve assembly is provided in which the body of the valve structure and the two flange members are designed for manufacture by machining from bar stock and additional clamping means are provided which may be of stamped or forged metal components for securing the flanges to the valve structure. The clamping means consists of two pairs of interlocking members which engage mating surfaces of the flange members and which themselves contain the apertures for receiving securing bolts.

BRIEF DESCRIPTION OF THE DRAWING:

FIG. 3 is a front elevation of a flange member in accordance with the invention.

FIG. 4 is a perspective view of a first embodiment of a clamping member according to the invention.

FIG. 5 is a perspective view of a second embodiment of a clamping member according to the invention.

FIG. 6 is an end elevation of a valve assembly utilizing the clamping members of FIG. 5.

Figure 1:
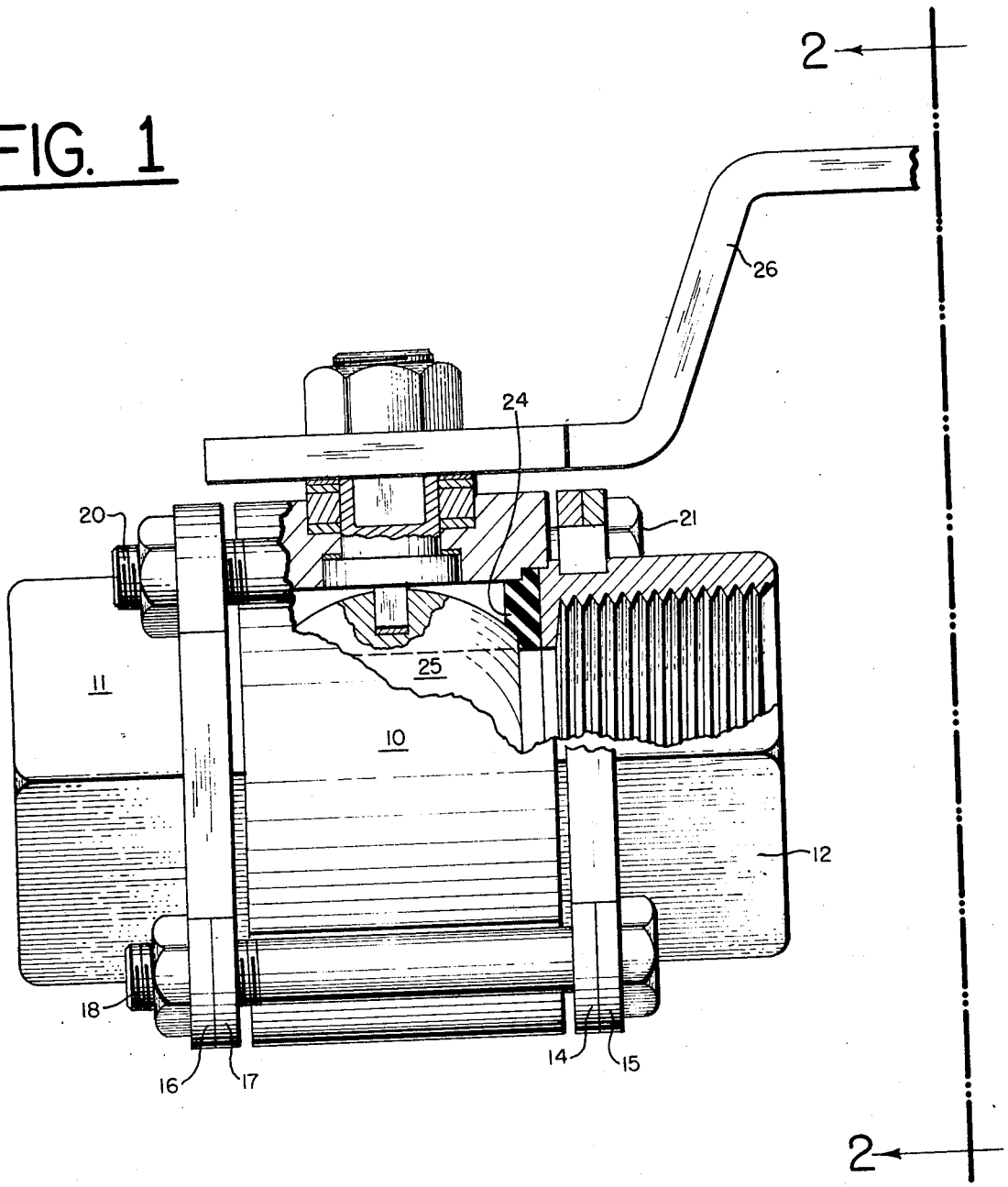
FIG. 1 is a front elevation partially cut away illustrating a valve assembly according to the invention.

DESCRIPTION OF A PREFERRED EMBODIMENT:

A between-flange ball valve is depicted in FIG. 1 in which both the body of the valve structure 10 and the flange members 11 and 12 were machined from bar stock. Flange members 11 and 12 are engaged by clamping members 14, 15, 16 and 17. Bolts 18, 20, 21 and 22 (FIG. 2) cooperating with clamping means 14, 15, 16 and 17 draw flanges 11 and 12 against valve structure 10, the joints being sealed by resilient annular seals 24.

While FIG. 1 depicts a ball valve in which apertured ball 25 is rotated by lever 26. Gate valves and other forms of valves and fluid control devices can also be made in between-flange form according to the invention.

Figure 2:
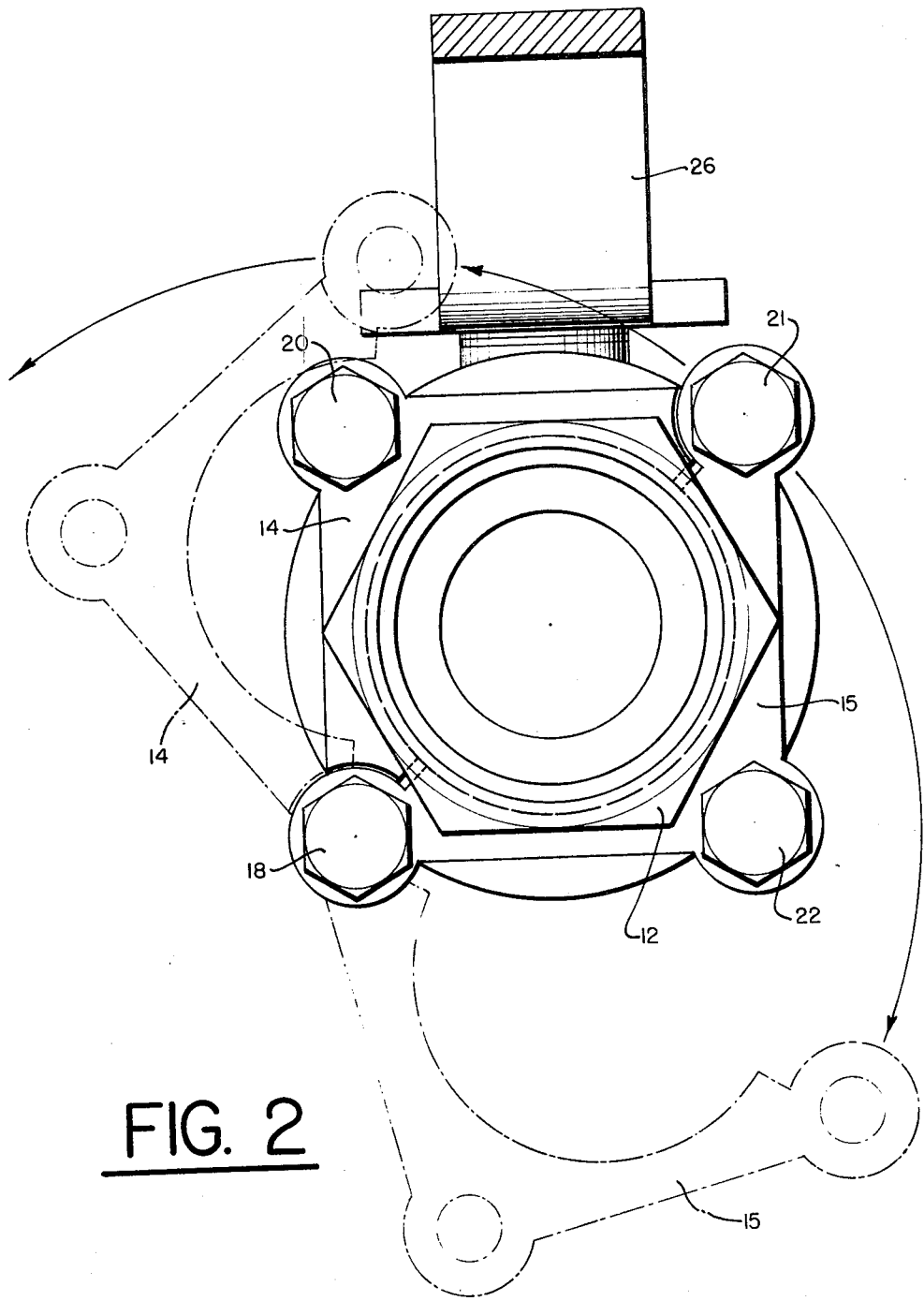
FIG. 2 is an end elevation taken along lines 2—2 of FIG. 1.

FIG. 2 is an end view along 2—2 of FIG. 1 depicting clamp members 14 and 15 engaged with flange member 12. Flange member 12 as depicted in FIG. 3 may be formed with an annular groove 29 for engaging clamping members 14 and 15.

Flanges 11 and 12 are depicted as internally threaded union members for engaging threaded pipes or fittings. The flange members can also be made for sweated joints or other means for joining to plastic or metal pipes or other fittings. Flanges can easily be changed so that any given valve structure, 10 can have a threaded flange on one end and a sweat flange on the other or any other combination. The clamping members, 14, 15, 16 and 17 are made in identical pairs. FIG. 4 depicts one member 27 of a pair.

In use, the second member of the pair would be rotated 180° with respect to member 27 and positioned with the reverse side up, bolt-receiving tabs 28 and 30 of each member superimposed. Since tabs 28 and 30 are made only one half the thickness of the rest of member 27, when the pair of members are interlocked together the thickness is uniform.

Clamping member 27 is designed for four bolt clamping since the bolt receiving tabs 28 and 30 will receive the same bolts as the matching tabs of the other member of the clamping pair. The third and fourth bolts will be received by tab 31 of member 27 and its counterpart in the matching member. The inner surface of clamp member 27 forms a semicircle for engaging half the periphery of flange 12.

When clamp member 27 is paired, a complete circle is formed for engaging the flange member.

Clamping members using two bolts only can be used as depicted in FIG. 5. Clamp member 34 of FIG. 5 is semicircular in form as is that of FIG. 4 but has only two bolt receiving tabs 35 and 36 positioned at its opposite ends.

FIG. 6 is an end elevation of a valve assembly according to the invention using the clamping members of FIG. 5. Thus, in FIG. 6 a pair of clamping members 37 and 38 are secured to a flange member 40 and to each other by bolts 41 and 42. Bolts 41 and 42 engage similar clamp members (not shown) at the opposite end of the assembly for clamping the valve in position.

Valves of the type described are frequently used with acids and other corrosive fluids requiring the valve and flanges to be made of titanium or other costly materials. Since the clamps, according to the invention, do not contact the controlled fluid, they may be made of steel or other much less expensive material and used in cooperation with valves of the more costly material.

In operation it will be seen that by removing one bolt (see FIG. 2), either bolt 21 or 18, clamping members 14 and 16 can be folded away from clamping members 15 and 17, pivoting about the remaining one of bolts 18 and 21 and taking bolts 20 and 22 with them. The clamping members 14, 15, 16 and 17 can then be drawn away leaving valve structure 10 (FIG. 1) free for removal and reinsertion.

The two-bolt clamping members described with relation to FIG. 5 and FIG. 6 operate in a similar manner.

While the invention has been described with relation to a specific valve structure, it is equally applicable to many different forms of valve structures. While the embodiments described have two ports, the invention is also applicable to three, four and five port valves with paired sets of clamps connected in orthogonal directions. Also, the number of bolts is not critical and alternative types of fastening devices other than bolts may be utilized.

Thus it is intended to claim the invention within the spirit and scope of the appended claims.

I claim:

1. A valve assembly for insertion in a line for carrying fluid comprising:
   a. A valve structure having at least first and second apertures for fluid flow;
   b. First and second flange members mateable with said first and second apertures and connectable to said line for insertion of said valve structure;
   c. First and second interlocking pairs of clamps comprised of stamped metal;
   d. An annular groove in each of said first and second flange members for engaging said first and second interlocking pairs of clamps; and,
   e. fastening means for compressively securing said first and second interlocking pairs of clamps each pair to the other while simultaneously securing said clamps in said interlocking pairs, engaging said clamps to said flange members and drawing said flange members into engagement with said valve structure mating with said first and second apertures and securing said valve structure in said line.

2. A valve assembly according to claim 1 wherein said valve structure comprises a body machined from bar stock and said flange members are comprised of machined bar stock.

3. A valve assembly according to claim 1 wherein said fastening means comprise a plurality of bolts.

4. Means for securing a control device in a fluid carrying line comprising:
   a. At least first and second flange members mateable with opposing apertured surfaces of said control device and designed to couple to said line for insertion of said device;
   b. First and second interlocking pairs of clamps;
   c. Engaging means comprising annular grooves integral with said first and second flange members for engaging said first and second interlocking pairs of clamps; and,
   d. fastening means for compressively securing said first and second interlocking pairs of clamps each pair to the other whereby said flange members may be drawn together mating with said control device and securing said device in said line.

* * * * *